United States Patent
Yamamoto

(10) Patent No.: US 9,676,174 B2
(45) Date of Patent: Jun. 13, 2017

(54) DEVICE AND METHOD FOR JOINING RUBBER MEMBERS

(71) Applicant: BRIDGESTONE CORPORATION, Tokyo (JP)

(72) Inventor: Hitoshi Yamamoto, Hikone (JP)

(73) Assignee: BRIDGESTONE CORPORATION, Tokyo (JP)

( * ) Notice: Subject to any disclaimer, the term of this patent is extended or adjusted under 35 U.S.C. 154(b) by 307 days.

(21) Appl. No.: 14/357,627

(22) PCT Filed: Nov. 15, 2012

(86) PCT No.: PCT/JP2012/079623
§ 371 (c)(1),
(2) Date: May 12, 2014

(87) PCT Pub. No.: WO2013/073605
PCT Pub. Date: May 23, 2013

(65) Prior Publication Data
US 2014/0318681 A1    Oct. 30, 2014

(30) Foreign Application Priority Data
Nov. 15, 2011    (JP) ................. 2011-250109

(51) Int. Cl.
*B29D 30/00*    (2006.01)
*B32B 37/10*    (2006.01)
(Continued)

(52) U.S. Cl.
CPC .............. *B32B 37/10* (2013.01); *B29C 65/56* (2013.01); *B29C 65/8215* (2013.01);
(Continued)

(58) Field of Classification Search
CPC ........ B29D 2030/421–2030/428; B29D 30/42; B29D 30/1607; B29D 30/20;
(Continued)

(56) References Cited

U.S. PATENT DOCUMENTS 2,702,070 A * 2/1955 Lindemann ............. B29C 65/00
                                                        156/502
2013/0299063 A1    11/2013 Iwasaki et al.

FOREIGN PATENT DOCUMENTS

EP    0 698 479 A1    2/1996
JP    H06-896 A       1/1994
(Continued)

OTHER PUBLICATIONS

International Search Report issued in International Application No. PCT/JP2012/079623 mailed Dec. 25, 2012.
(Continued)

*Primary Examiner* — Carson Gross
(74) *Attorney, Agent, or Firm* — Oliff PLC

(57) ABSTRACT

When overlapping and joining together end portions of a rubber member, it becomes possible to join them at a joining area smaller than a conventional one by increasing the joining area. There is provided a joining device for overlapping end portions, of a rubber member (tire constituent member) with one upper end portion placing on the other lower end portion and joining the end portions of the rubber member, in which a pressing roll (disk-shaped roll) rotating about an inclined shaft is rolled while being pressed against the overlapped upper end portion of the rubber member, and the upper end portion is extended by a shearing force generated at this time to increase a joining area between the both end portions.

8 Claims, 9 Drawing Sheets

(51) Int. Cl.
 *B29D 30/42* (2006.01)
 *B29C 65/00* (2006.01)
 *B29C 65/56* (2006.01)
 *B29C 65/82* (2006.01)

(52) U.S. Cl.
 CPC ........ *B29C 66/1122* (2013.01); *B29C 66/344* (2013.01); *B29C 66/4322* (2013.01); *B29C 66/49* (2013.01); *B29C 66/71* (2013.01); *B29C 66/72141* (2013.01); *B29C 66/73752* (2013.01); *B29C 66/81415* (2013.01); *B29C 66/81419* (2013.01); *B29C 66/81423* (2013.01); *B29C 66/81433* (2013.01); *B29C 66/81435* (2013.01); *B29C 66/81465* (2013.01); *B29C 66/81469* (2013.01); *B29C 66/8242* (2013.01); *B29C 66/8362* (2013.01); *B29D 30/42* (2013.01); *B29C 66/1162* (2013.01); *B29C 66/341* (2013.01); *B29C 66/7212* (2013.01); *B29D 2030/423* (2013.01); *B29D 2030/424* (2013.01); *B29D 2030/425* (2013.01); *Y10T 156/10* (2015.01)

(58) Field of Classification Search
 CPC .......... B29D 30/3007; B29C 66/81415; B29C 66/81417; B29C 66/81419
 USPC .................. 156/110.1, 136, 134, 304.1, 502
 See application file for complete search history.

(56) References Cited

FOREIGN PATENT DOCUMENTS

| | | | |
|---|---|---|---|
| JP | 2001-105508 A | | 4/2001 |
| JP | A-2001-294014 | | 10/2001 |
| JP | 2004142219 A | * | 5/2004 |
| JP | 2005153349 A | * | 6/2005 |
| JP | A-2005-153349 | | 6/2005 |
| JP | A-2008-110586 | | 5/2008 |
| JP | 2010-149398 A | | 7/2010 |
| JP | 2010149398 A | * | 7/2010 |
| JP | A-2011-173395 | | 9/2011 |
| JP | A-2012-16869 | | 1/2012 |
| WO | 2011/007833 A1 | | 1/2011 |
| WO | 2011/125405 A1 | | 10/2011 |

OTHER PUBLICATIONS

Nov. 11, 2015 Extended Seach Report issued in European Patent Application No. 12849841.7.

* cited by examiner

FIG. 8
CONVENTIONAL PRODUCT
BEFORE PULLING
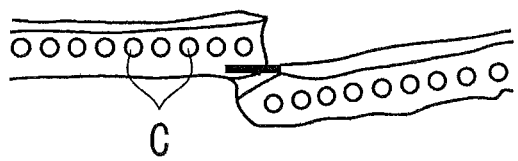
C
AFTER PULLING
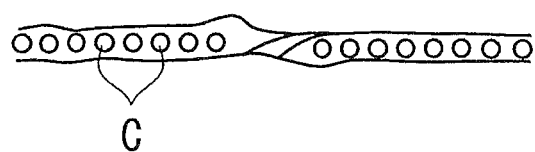
C
PRODUCT OF PRESENT INVENTION
BEFORE PULLING
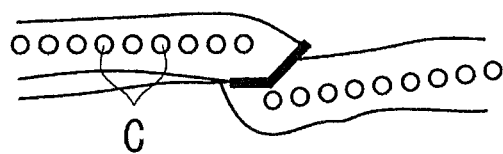
C
AFTER PULLING
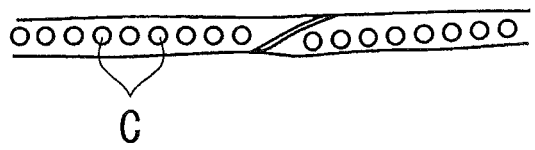
C

PRIOR ART

DEVICE AND METHOD FOR JOINING RUBBER MEMBERS

TECHNICAL FIELD

The present invention relates to a device and a method for joining rubber members in which end portions of a rubber member are butted on each other and joined.

BACKGROUND ART

There is well known a joining device provided in a tire molding apparatus, configured to overlap end portions of a rubber member, e.g., a tire constituent member on a molding drum vertically, that is, with one of the end portions positioned outside in a radial direction of the tire molding drum and the other positioned inside in the radial direction thereof, press a pressing roll against the overlapped portion, and join the end portions together (for example, see Patent Literature 1).

FIG. 9 is a perspective view schematically illustrating a principle of such joining of the tire constituent member.

In this conventional joining device for tire constituent member, a tire constituent member 100 made of a rubber material and having a predetermined length is wound around a molding drum with end portions 101 and 102 thereof overlapped with each other vertically, and a pressing roll 110 is rolled on and presses the overlapped portion. This allows the end portions 101 and 102 of the tire constituent member 100 to be joined together by utilizing adhesiveness of an unvulcanized rubber, thereby forming a cylindrical body such as a carcass ply.

In such a case where both end portions of the tire constituent member are overlapped, and the pressing roll 110 presses the overlapped portion from above to join them, as a matter of course the smaller (or narrower) an amount of the overlap (joining area) is, the lower joint strength thereof becomes. Thus, there is a problem that required joint strength cannot be maintained unless a certain joining area is ensured.

CITATION LIST

Patent Literature

PTL 1: Japanese Patent Laid-Open No. 2011-173395

SUMMARY OF INVENTION

Technical Problem

The present invention has been made in view of the conventional problem occurring when the end portions of the rubber member having a predetermined length are joined together, and an object thereof is to allow joining with required joining force (or bonding force) by increasing the joining area in joining, even in case of a small joining area that cannot maintain joint strength only by overlapping the both end portions of the rubber member and pressing the pressing roll against the overlapped portion as in the conventional approach.

Solution to Problem

One aspect of the present invention is a device for joining overlapped end portions of a rubber member with one of the end portions placing on the other end portion of the rubber member, the device including: a pressing roll rotating about an inclined shaft inclined with respect to a surface of the end portion of the rubber member; means for pressing a rolling surface of the pressing roll against the overlapped upper end portion of the rubber member; and a moving unit for rolling the rolling surface of the pressing roll while pressing the rolling surface thereof against the upper end portion of the rubber member, wherein joining is performed with the upper end portion being extended and a joining area between the end portions to be joined being increased by rolling the rolling surface of the pressing roll while pressing it against the upper end portion of the rubber member.

Another aspect of the present invention is a method for joining overlapped end portions of a rubber member with one of the end portions placing on the other end portion of the rubber member, the method including the steps of: pressing a rolling surface of a pressing roll rotating about an inclined shaft inclined with respect to a surface of the end portion of the rubber member against the overlapped upper end portion of the rubber member; and rolling the rolling surface of the pressing roll while pressing the rolling surface thereof against the upper end portion of the rubber member, wherein joining is performed with the upper end portion being extended and a joining area between the end portions to be joined being increased by rolling the rolling surface of the pressing roll while pressing it against the upper end portion of the rubber member.

Advantageous Effects of Invention

According to the present invention, it is possible to join rubber members with required joining force by increasing the joining area even in a case where required joining force cannot be obtained by the conventional pressing roll that overlaps end portions of the rubber member with each other, and presses the overlapped portions from above to join them.

BRIEF DESCRIPTION OF DRAWINGS

FIGS. 1A and 1B each illustrate a disk-shaped roll used in a joining device according to an embodiment of the present invention, in which FIG. 1A is a perspective view thereof and FIG. 1B is a front view thereof.

FIG. 8 is a pattern diagram illustrating the carcass ply as the conventional product and the carcass ply as the product of the present invention by comparing states before and after the pulling, respectively.

DESCRIPTION OF EMBODIMENTS

A joining device according to an embodiment of the present invention will be described with reference to the accompanying drawings.

First, description will be given of a pressing roll (disk-shaped roll in the present embodiment) to be used in the present joining device.

Figure 1A:
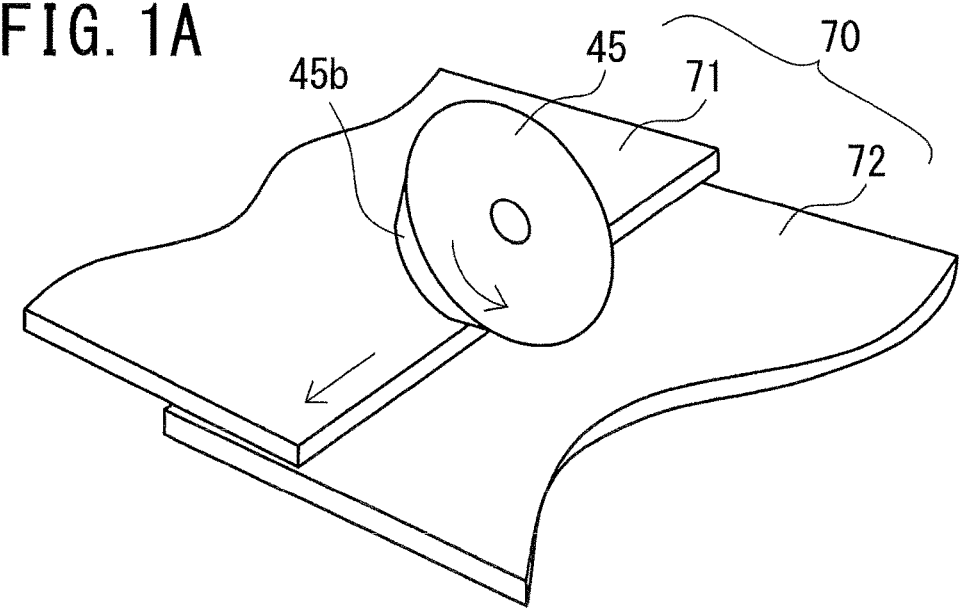
Figure 1B:
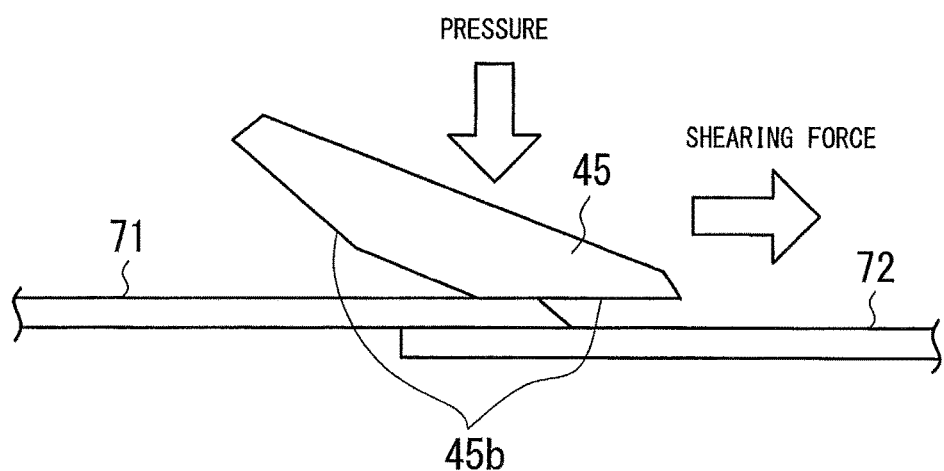
Figure 2A:
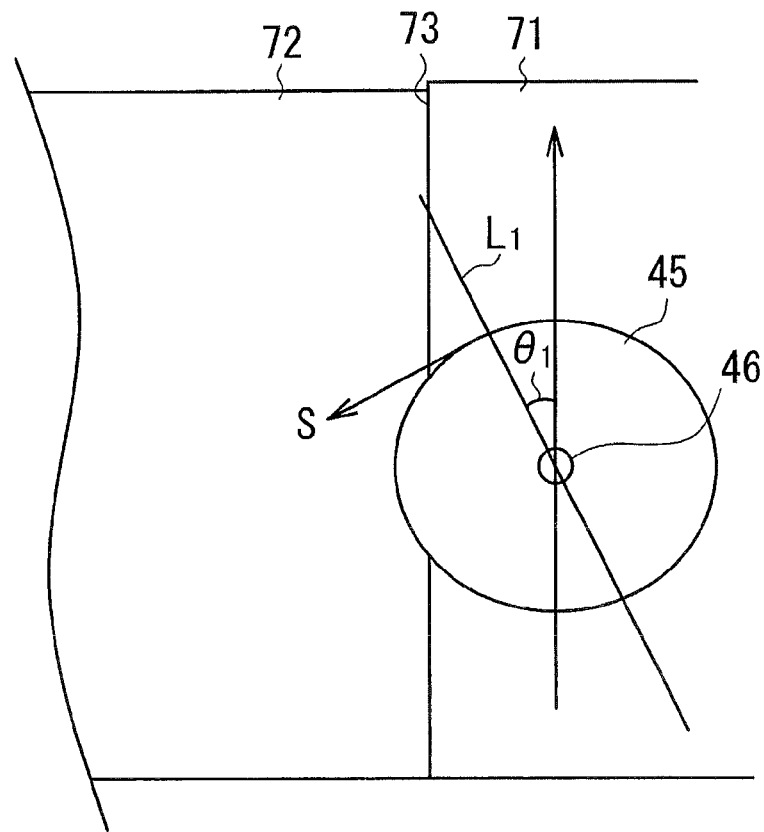
FIG. 2A is a plan view of the disk-shaped roll and FIG. 2B is a side view thereof as viewed in a direction perpendicular to a line L1 of FIG. 2A.

FIGS. 1A and 1B each illustrate a disk-shaped roll, in which FIG. 1A is a perspective view thereof, and FIG. 1B is a front view thereof. FIG. 2A is a plan view of the disk-shaped roll and FIG. 2B is a side view thereof as viewed in a direction perpendicular to a line L1 of FIG. 2A.

As illustrated in FIG. 1A, a disk-shaped roll 45 has a rolling surface 45b which is inclined to a center thereof and which is rolled on vertically overlapped upper and lower portions 71 and 72 of a rubber member, i.e., in the present embodiment tire constituent member 70. The disk-shaped roll 45 is preferably formed into a truncated cone shape including upper and lower flat surfaces.

Figure 2B:
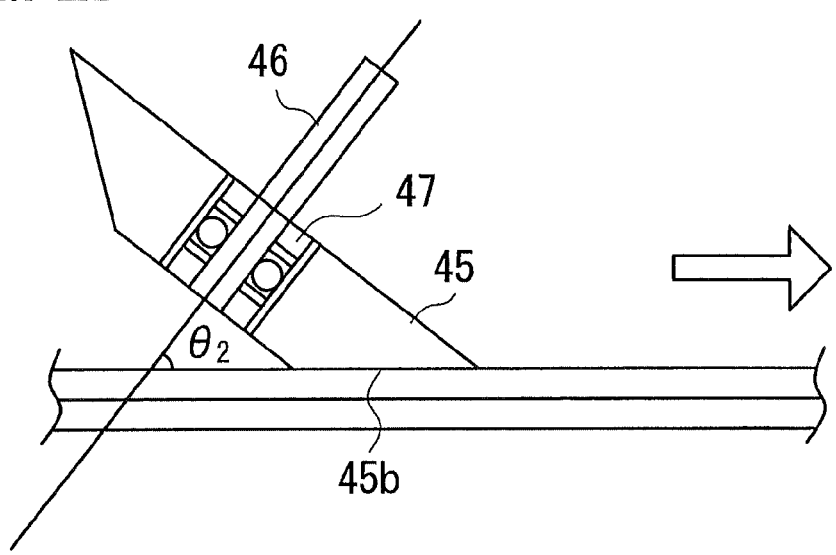

As illustrated in FIG. 2B, the disk-shaped roll 45 is rotatably supported by a roll shaft 46 which is an inclined shaft fixed to a support 45a of the joining device to be described later through a bearing 47.

As illustrated in FIG. 2A, the roll shaft 46 is disposed being inclined by a predetermined inclination angle $\theta_1$ in a plan view toward a joining end 73 with respect to a travel direction of the roll 45 and disposed being inclined forward by $\theta_2$ with respect to the upper end portion 71 of the tire constituent member 70. The rolling surface 45b of the disk-shaped roll 45 has a roughened surface throughout on which a plurality of convexities and concave grooves or a plurality of protrusions and depressions is formed by knurling or the like.

When the joining device to be described later provided with the disk-shaped roll 45 is moved, the disk-shaped roll 45 is rolled about the roll shaft 46 with the inclined rolling surface 45b being pressed against the upper end portion 71 of the tire constituent member 70. The disk-shaped roll 45 is disposed being inclined by $\theta_1$ (FIG. 2A) with respect to the travel direction and inclined by $\theta_2$ (FIG. 2B) with respect to a surface of the end portion 71, so that when the disk-shaped roll 45 is moved while being pressed against the end portion 71 by the joining device, the disk-shaped roll 45 abuts against the end portion 71 along the line L1 of FIG. 2A when being rolled to apply shearing force S to a direction perpendicular to the line L1.

When the shearing force S acts on the end portion 71 of the tire constituent member 70, the end portion 71 made of a rubber material is extended and, accordingly, a joining (bonding) area where the end portions 71 and 72 are overlapped with each other is increased, and joining is performed with the increased area of joining.

Thus, even in a case where required joint strength cannot be obtained only by pressing and rolling a cylindrical roll on the upper end portion 71 with the end portions of the tire constituent member 70 being overlapped with each other, as in the conventional approach, it is possible to obtain required joint strength by using the present disk-shaped roll 45.

Further, in a case where an a margin for overlapping of the end portions 71 and 72 before the joining is the same, larger joining force can be obtained.

The joining surface of the disk-shaped roll 45 is subjected to the surface roughening and, thus, when the disk-shaped roll 45 is pressed against and rolled on the tire constituent member 70, larger shearing force S can be generated in the end portion 71 abutted to the joining surface by friction force thereof, as compared to a case where the joining surface is not subjected to the surface roughening, thereby allowing the end portion 71 to be extended more effectively.

Further, setting an overlap width between the end portions 71 and 72 smaller than a width (pressing width) of the rolling surface 45b of the disk-shaped roll 45 allows uniform expansion of the end portion 71 when applying the shearing force S to the end portion 71 to extend it.

The following describes the joining device provided with the above-described disk-shaped roll 45.

Figure 3:
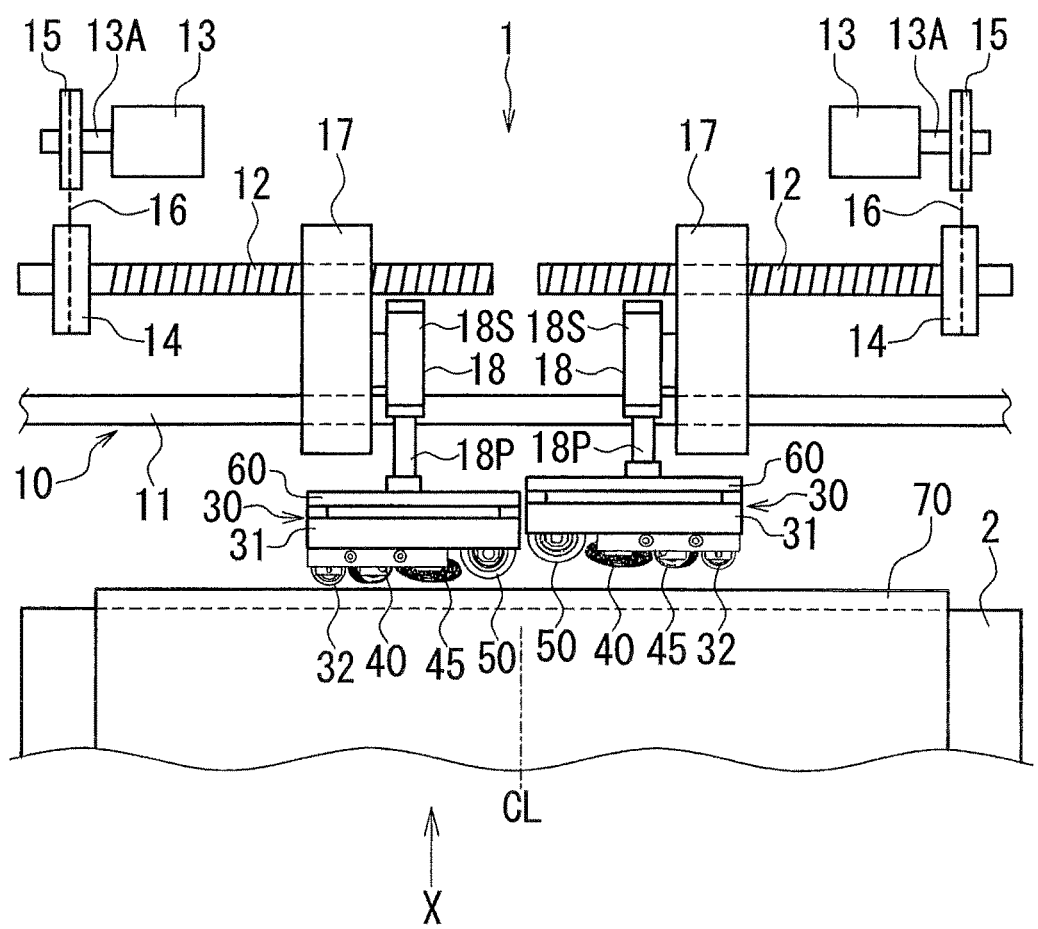
FIG. 3 is a front view of an essential part schematically illustrating a configuration of a joining device for a tire constituent member of the present embodiment.

FIG. 3 is a front view of an essential part schematically illustrating a configuration of the joining device.

As illustrated, a joining device 1 includes a cylindrical molding drum 2 having an axial line held in a horizontal direction and a pair of joining units 30 arranged side by side in an axial line direction of the molding drum 2 for joining the tire constituent member 70. The joining device 1 further includes moving means 10 for moving the pair of joining units 30 in the axial line direction and in a radial direction of the molding drum 2 (in a horizontal direction and in a vertical direction in FIG. 1). The moving means 10 is disposed above the molding drum 2 along an outer peripheral surface thereof.

The molding drum 2 is a support supporting the tire constituent member 70 to be joined at molding of an unvulcanized tire and configured to be rotatable about the axial line thereof and extendable/contractable by a bladder or the like provided in an outer periphery thereof. The molding drum 2 is wrapped with, at a predetermined position of its outer periphery, the tire constituent member 70 of a length corresponding to one round of the molding drum 2 and holds a cylindrical tire constituent member 70 in a concentric manner. The molding drum 2 is driven to rotate by a drive unit (not illustrated) connected therewith, a drive source such as a motor provided in the drive unit, and a transmission mechanism of rotation power from the drive source and can rotate the tire constituent member 70 at a predetermined rotation speed and stop it at an arbitrary rotation angle.

The tire constituent member 70 is supplied toward the molding drum 2 from a supply unit (not illustrated) and wrapped around the molding drum 2 such that a leading end portion and a rear end portion of the wrapped tire constituent member 70 are disposed being overlapped with each other.

The tire constituent member 70, which itself is a known member, is formed by coating cords made of organic fiber or steel with an unvulcanized rubber. In rubber on the surface, a plurality of cords (not illustrated) is arranged in parallel so as to extend along the axial line direction of the molding drum 2.

The molding drum 2 supports both end portions 71 and 72 to be joined of the tire constituent member 70 in a state where the both end portions 71 and 72 are vertically overlapped with each other, and the joining device 1 moves the respective joining units 30 on the vertically overlapped end portions 71 and 72 of the tire constituent member 70 along the joining end 73 between the end portions 71 and 72 to join the end portions 71 and 72.

The joining device 1 has asymmetrical configuration with respect to a center portion CL in the axial line direction of the molding drum 2. Thus, hereinafter, description will be given of one side (left side in FIG. 3) with respect to the center portion CL.

The moving means 10 includes a guide rail 11 laid in parallel to the axial line of the molding drum 2, a screw shaft 12 disposed parallel to and above the guide rail 11, a motor 13 disposed such that an rotary shaft 13A thereof extends parallel to the screw shaft 12, and a frame (not illustrated) to which the above members are mounted.

The moving means 10 rotatably supports the screw shaft 12 by the frame and has an endless belt 16 stretched between a driven pulley 14 fixed to the screw shaft 12 and a driving pulley 15 fixed to the rotary shaft 13A of the motor 13. Further, the moving means 10 transmits the rotation power from the motor 13 to the screw shaft 12 through the driving pulley 15, the belt 16 and the driven pulley 14 to thereby rotate the screw shaft 12 at a predetermined speed in both directions about an axial line thereof.

The moving means 10 has a mounting bracket 17 mounted on the screw shaft 12 and a piston/cylinder mechanism 18 fixed to a side surface of the mounting bracket 17 so as to extend downward.

The mounting bracket 17 is driven by a screw transmission mechanism constituted by a ball screw or the like screwed with the screw shaft 12 penetrating therethrough. That is, the mounting bracket 17 has a screw hole and a guide hole through which the guide rail 11 slidably penetrate and moves, along with rotation of the screw shaft 12, at a predetermined speed in both directions along the axial line of the molding drum 2 while being guided by the guide rail 11.

The piston/cylinder mechanism 18 has a piston rod 18P that moves retractably in a cylinder 18S. The piston rod 18P is disposed above the molding drum 2 so as to extend toward the axial line of the molding drum 2. The piston/cylinder mechanism 18 makes the piston rod 18P advance and retreat and thus causes the joining unit 30 fixed to a leading end (lower end) thereof to move to or from the tire constituent member 70. That is, the piston/cylinder mechanism 18 presses the disk-shaped roll 45 and the like fixed to the joining unit 30 against the upper end portion 71 of the tire constituent member 70 to be joined with a predetermined pressure or pulls the disk-shaped roll 45 and the like up from the upper end portion 71.

The joining unit 30 includes a rectangular plate-like fixing member 60 fixed to the piston rod 18P of the moving means 10 and a rectangular frame body 31 fixed to a lower surface of the fixing member 60. The frame body 31 is disposed along joint portion of the tire constituent member 70. The joining unit 30 moves integrally with the fixing member 60 and the frame body 31 by the moving means 10.

Figure 4:
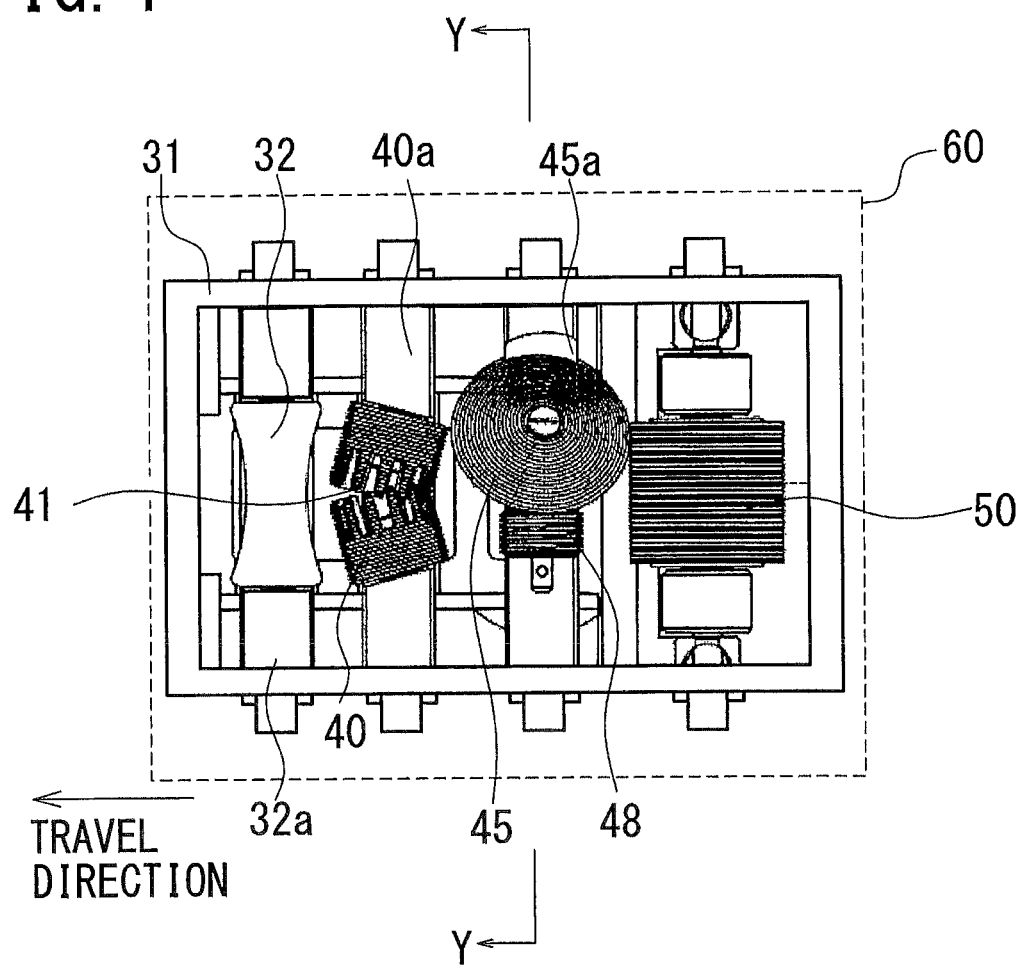
FIG. 4 is a bottom view of a joining unit as viewed in an arrow X direction of FIG. 3.

FIG. 4 is a bottom view of the joining unit 30 as viewed in an arrow X direction of FIG. 3 and illustrates a configuration thereof on the frame body 31 side by seeing through the fixing member 60 (denoted by a dashed line in FIG. 4).

As illustrated in FIG. 4, the joining unit 30 has, within the frame body 31, a floating prevention roll 32, zipper rolls 40, and the disk-shaped roll 45 serving as a pressing roll which are arranged in order from a front side (left side) in a joining direction toward a rear side (right side). Further, a small-diameter side pressing roll (preferably having a ring shape) 48 which is another pressing roll is fixed adjacent to (in FIG. 4, on the lower side of) the disk-shaped roll 45. Further, a rear pressing roll (ring-shaped roll in the present embodiment) 50 which is a still another pressing roll is disposed rearward of the disk-shaped roll 45.

The floating prevention roll 32 and the zipper rolls 40 are supported by a support 32a and a support 40a to rotate with respect to axial lines thereof respectively, and the supports 32a and 40a are each connected to the fixing member 60 through biasing means to be described later. Similarly, the support 45a of the disk-shaped roll 45 is connected to the fixing member 60 through biasing means. On the other hand, the ring-shaped roll 50 is directly connected to the fixing member 60.

The floating prevention roll 32 is rotatably supported by the support 32a, has an outer peripheral surface formed into a concave curve shape with a curvature corresponding to a surface shape of the molding drum 2, and is disposed such that an axial line direction thereof is aligned with a direction perpendicular to the axial line direction of the molding drum 2.

The floating prevention roll 32 is pressed against and rolled on the both end portions 71 and 72 of the tire constituent member 70 to press a portion where the both end portions 71 and 72 are vertically overlapped with each other and its neighboring area against the molding drum 2.

The zipper rolls 40 each have a cylindrical shape, and one end portions thereof are supported by the shaft supports 40a on both sides. Further, the zipper rolls 40 are disposed in a symmetrical manner with respect to the joining end 73 of the tire constituent member 70 such that the respective axial lines thereof are inclined, by a predetermined angle, with respect to a line perpendicular to the travel direction toward the travel direction. Here, the zipper rolls 40 are disposed such that the predetermined angle is set, for example, between 5° and 30° and that an intersection between the both axial lines is positioned above the joining end 73.

The zipper rolls 40 have respectively a plurality of protrusions 41 each protruding in an axial line direction along opposing edge portions thereof, formed in a circumferential direction at regular intervals and in the same number and, on the joining end 73 side, the protrusions 41 and recesses between the protrusions 41 are alternately provided in the circumferential direction at the same pitch.

The above protrusions 41 and recesses are alternately arranged along the circumference of each zipper roll 40, some protrusions 41 of one zipper roll 40 enter between and bite with the protrusions 41 (i.e., recesses) of the other zipper roll 40, and thereby the zipper rolls 40 are rotated at the same speed in synchronization.

The zipper rolls 40 properly positions the tire constituent member on the molding drum 2, since, during its rotational movement, the respective protrusions 41 thereof abut against the end portions 71 and 72 of the tire constituent member 70 to be pressed against a predetermined range of each of the end portions 71 and 72, and thereby the end portions 71 and 72 are drawn toward each other to eliminate loosening and the like of the tire constituent member.

Figure 5:
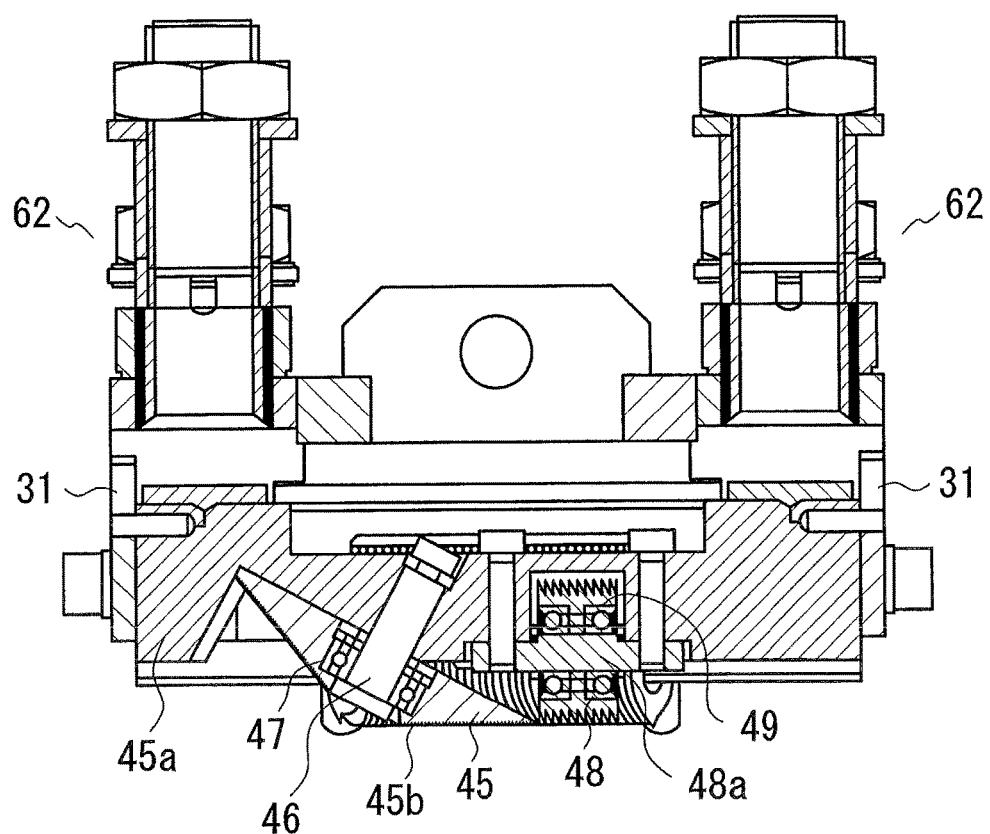
FIG. 5 is a cross-sectional view as viewed in an arrow Y-Y direction of FIG. 4 and illustrates a state where the disk-shaped roll is mounted on a roll shaft fixed to a support for the disk-shaped roll.

FIG. 5 is a cross-sectional view as viewed in an arrow Y-Y direction of FIG. 4 and illustrates a state where the disk-shaped roll 45 is mounted on the roll shaft 46 fixed to the support 45a for the disk-shaped roll 45.

As described above, the roll shaft 46 is inclined as illustrated with respect to the end portion 71 of the tire constituent member.

Adjacent to the disk-shaped roll 45, the side pressing roll 48 is rotatably mounted, through a bearing 49, on a roll shaft 48a fixed to the same support 45a supporting the disk-shaped roll 45. The side pressing roll 48 has a plurality of grooves formed at regular intervals on a peripheral surface thereof and is adjacently disposed on the right side in FIG. 5, that is, an outside (the joining end side) of the disk-shaped roll 45.

The side pressing roll 48 abuts against and holds the lower end portion 72 of the tire constituent member 70 when the rolling surface 45b of the disk-shaped roll 45 abuts against the upper end portion 71 of the tire constituent member 70 and extends, so as to prevent the lower end portion 72 from being moved together with the upper end portion 71.

In FIG. 5, reference numeral 62 denotes biasing means, such as a mechanical or hydraulic spring, fitted to the frame body 31. The frame body 31 is connected to the fixing member 60 through the biasing means 62. On the other hand, as described above, the ring-shaped roll 50 is directly connected to the fixing member 60 and, in a free state where the ring-shaped roll 50 does not abut against the tire constituent member 70, a lower end of the ring-shaped roll 50 is positioned above a line connecting lower ends of the floating prevention roll 32, zipper rolls 40, and disk-shaped roll 45, as illustrated in FIG. 3.

Therefore, when the piston rod 18P of the piston/cylinder mechanism 18 is activated to move down the fixing member 60 in a state of FIG. 3, first the floating prevention roll 32, zipper rolls 40, and disk-shaped roll 45 abut against the upper end portion 71 of the tire constituent member 70. After that, the fixing member 60 is further moved down against biasing force of the biasing means 62, and a pressure is applied to press the ring-shaped roll 50 into the rubber material of the end portion 71 to stop the moving down, when the ring-shaped roll 50 abuts against the end portion 71.

With the above configuration, the floating prevention roll 32, zipper rolls 40, and disk-shaped roll 45 press the end portion 71 by means of resisting force against the biasing force of the biasing means 62, while the ring-shaped roll 50 presses the end portion 71 by means of pressure force of the piston/cylinder mechanism 18, and thereby the both end portions 71 and 72 are joined.

In this case, since pressing-down force of the piston rod 18P directly acts on the ring-shaped roll 50, pressing force of the ring-shaped roll 50 is larger than those of the rolls 32, 40, and 45 and the like acting the pressing-down force through the biasing means 62.

The following describes a procedure of joining the end portions 71 and 72 of the tire constituent member 70 made of rubber by the joining device 1 and a production method of producing the tire constituent member 70 by joining the end portions 71 and 72. The following procedure and the like are executed under control of a controller (not illustrated).

The controller has a microcomputer, not illustrated, which includes, e.g., a microprocessor (MPU), a ROM (Read Only Memory) that stores programs for executing various control processing, and a RAM (Random Access Memory) that temporarily stores data to be directly accessed by the MPU. Further, the controller is connected with each section of the device through connection means and controls the sections connected thereto to make the sections work in association with each other for executing each joining work at a previously set timing or under previously set conditions.

For joining the end portions 71 and 72 of the tire constituent member 70 (see FIG. 1), first a member such as an inner liner to be disposed inside the tire constituent member 70 is disposed on the outer periphery of the molding drum 2, then the tire constituent member 70 is wrapped one turn around the outer periphery of the rotating molding drum 2, and the molding drum 2 is stopped. At this time, the end portions 71 and 72 are overlapped with each other vertically, and the joining unit 30 is disposed at a pressing position by the moving means 10.

Subsequently, the joining unit 30 on one side (left side in FIG. 3) is moved to the center portion CL of the molding drum 2 by the moving means 10. Then, the moving means 10 is once stopped, and the piston/cylinder mechanism 18 is activated to move down the joining unit 30 to press the floating prevention roll 32, respective zipper rolls 40, and ring-shaped roll 50 against the overlapped end portions 71 and 72 (see FIG. 2) of the tire constituent member 70 (as preferable pressure condition, pressure of the piston/cylinder mechanism 18 is in a range of 20 kgf to 140 kgf). This causes the floating prevention roll 32 and outer peripheral portions (tip portions of the protrusions 41) of the zipper rolls 40 to abut against the end portions 71 and 72 of the tire constituent member 70.

Subsequently, the moving means 10 is activated to move the joining unit 30 in the axial line direction of the molding drum 2, that is, along the joining end 73 of the tire constituent member 70. The floating prevention roll 32, zipper rolls 40, disk-shaped roll 45, side pressing roll 48, and ring-shaped roll 50 are pressed against the end portions 71 and 72 of the tire constituent member 70 and are therefore rolled along the joining end 73 of the tire constituent member along with the movement of the joining unit 30.

At this time, the floating prevention roll 32 is rolled on the both end portions 71 and 72 while sequentially pressing the end portions 71 and 72, and the zipper rolls 40 inclined in opposite directions to each other are rolled on the both end portions 71 and 72 while drawing the both end portions 71 and 72 toward each other. Then, the shearing force generated by the rolling surface 45b of the disk-shaped roll 45 that is rolled subsequently acts on the upper end portion 71 of the tire constituent member 70 to extend the end portion 71, that is, to increase the bonding area of the overlapped portion between the end portions 71 and 72. At the same time, the side pressing roll 48 holds the lower end portion 72 so as to prevent the lower end portion 72 from being moved together with the upper end portion 71 when the disk-shaped roll 45 extends the upper end portion 71. Subsequently, the ring-shaped roll 50 (see FIG. 4) presses firmly the increased joining area between the both end portions 71 and 72 to join the end portions 71 and 72.

Preferably, there is provided heating means (not illustrated) that heats the ring-shaped roll 50 from inside or outside thereof. That is, the heating means is used to heat up the rolling surface of the ring-shaped roll 50 to a predetermined temperature and maintain the temperature, thereby softening the rubber around the both end portions 71 and 72 of the tire constituent member 70 at the pressing (friction) position, which increases joining effect of the ring-shaped roll 50 between the both end portions 71 and 72 to allow joining of the end portions 71 and 72 with high joint strength.

In the manner as described above, the joining of the tire constituent member is performed using the joining device 1 on one side to some extent and, then, the piston/cylinder mechanism 18 on the other side is activated to move down the joining unit 30 (on the right side in FIG. 3) near the center portion CL of the molding drum 2. However, a descent position is set to a position where the joining by the left-side joining unit 30 has been already completed, and the right-side joining unit 30 is moved in a direction opposite to the travel direction of the right-side unit 30 from the descent position. That is, the pair of joining units 30 are moved outward in the axial line direction of the molding drum 2 in opposite directions to each other at the same speed to make each of the rolls 32, 50, zipper rolls 40, and disk-shaped roll 45 roll along the end portions 71 and 72 to sequentially join the entire end portions 71 and 72.

Figure 6:
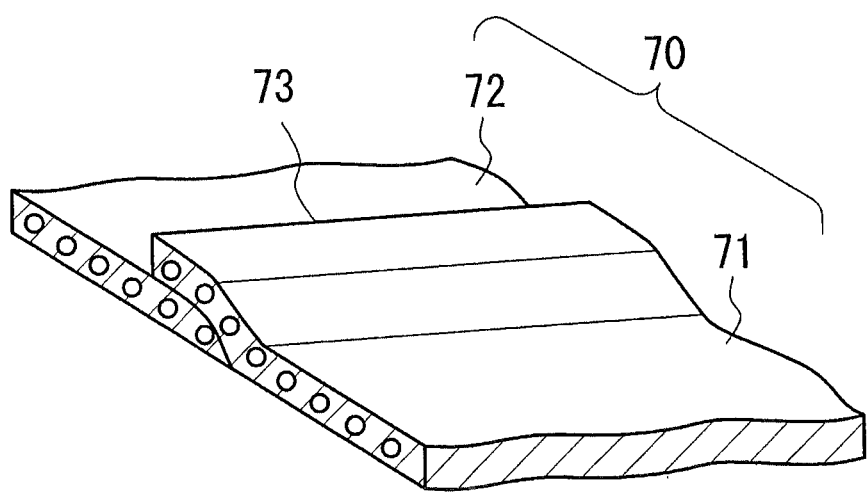
FIG. 6 is a perspective view illustrating end portions of the tire constituent member joined together.

FIG. 6 is a perspective view illustrating the end portions 71 and 72 of the tire constituent member 70 thus joined together. The tire constituent member 70 is joined in a state where the end portion 71 is extended to increase the joining area.

An unvulcanized tire having a predetermined shape and structure may be molded such as by disposing another tire constituent member on the joined tire constituent member 70, various types of tires may be produced by vulcanizing and molding the unvulcanized tire.

The embodiment of the present invention has thus been described. In the present embodiment, the disk-shaped roll 45 is combined with the floating prevention roll 32, zipper rolls 40, ring-shaped roll 50, and side pressing roll 48 to construct the joining unit 30, so that a travel direction of the associated with the rolling is restricted to ensure rectilinearity, thereby enabling stable operation.

While the embodiment of the present invention has been described taking the joining device that joins the tire constituent member 70 on the molding drum 2 as an example, use of the joining device 1 allows the joining of the tire constituent member 70 similarly even on a support other than the molding drum 2, such as a planar support or a conveyor.

Next, taking a carcass ply as an example of the tire constituent member, results of an experiment performed for a product obtained by joining using joining device according to the present invention and a conventional product obtained by joining using the conventional device will be described.

Figure 7:
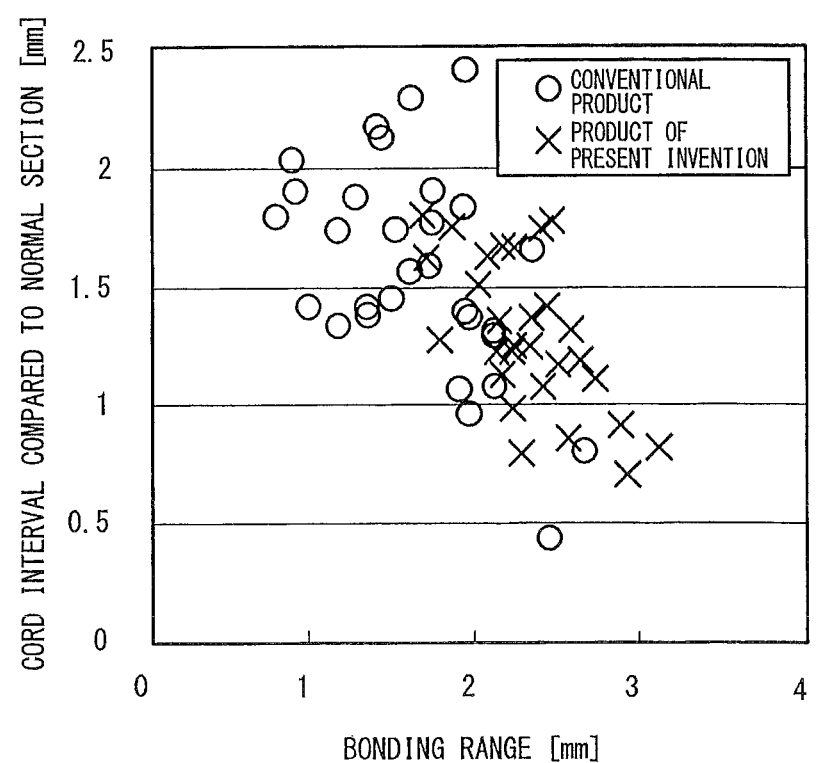
FIG. 7 is a graph representing tensile strength of a product of the present invention and that of a conventional product when a carcass ply formed by joining the end portions thereof on a molding drum is pulled with the same tension force by a relationship between extension of an interval between cords buried in the carcass ply and a bonding range (length in the axial direction of the molding drum) of a joining portion.
Figure 9:
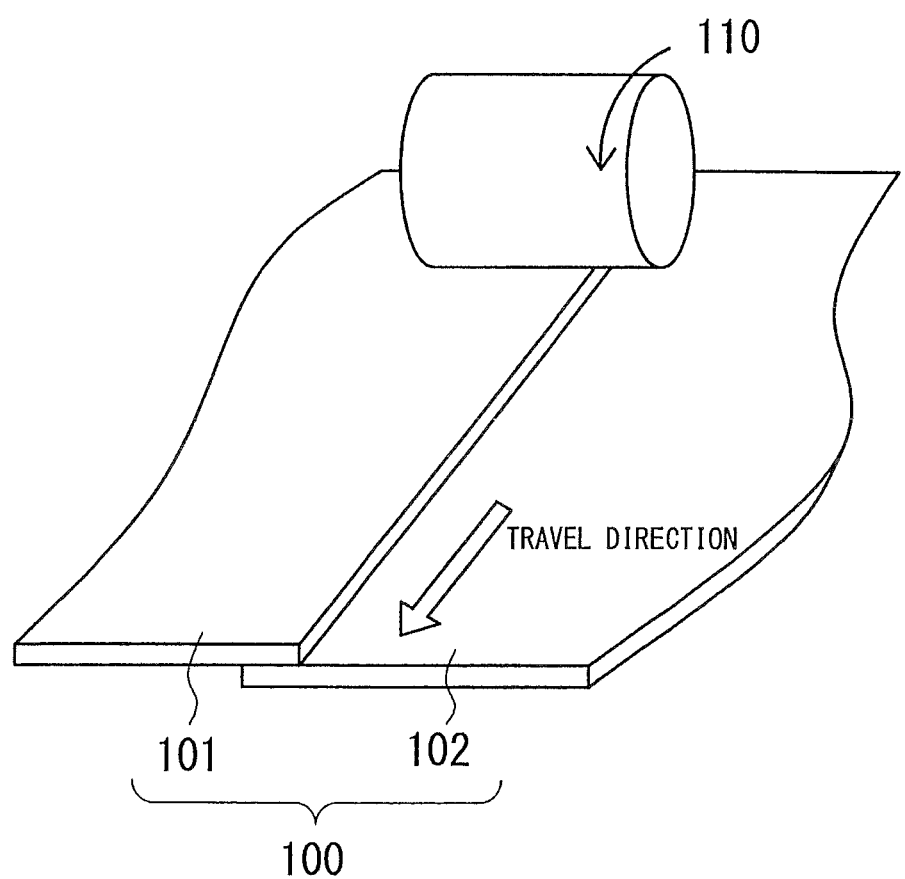
FIG. 9 is a perspective view schematically illustrating a principle of joining of the tire constituent member using a conventional pressing roll.

FIG. 7 is a graph representing tensile strength of the product of the present invention and that of the conventional product when the carcass ply formed by joining the end portions thereof on the molding drum is pulled with the same tension force by a relationship between extension of an interval between cords buried in the carcass ply and a bonding range (length in the axial direction of the molding drum) of the joint portion.

In the graph, ○ denotes the conventional product, and x denotes the product of the present invention.

FIG. 8 is a pattern diagram illustrating the carcass ply as the conventional product and the carcass ply as the product of the present invention by comparing states before and after the pulling, respectively.

As is clear from FIGS. 7 and 8, the product of the present invention has a larger joining range and smaller interval between the cords C after the pulling than the conventional product. That is, the product of the present invention is advantageous over the conventional product in terms of the tensile strength.

Experimental results reveal that it is preferable to set the overlap width between the upper and lower end portions 71 and 72 of the tire constituent member 70 used in the present embodiment in a range of 0.1 mm to 10 mm. When the overlap width falls within the above range, effect obtained by extending the upper end portion 71 using the present joining device for joining is remarkable. When the overlap width is less than 0.1 mm, an absolute value of the overlap width is small in the first place, so that the effect obtained by extending the upper end portion is limited. Conversely, when the overlap width exceeds 10 mm, the absolute value thereof is large and, thus, required joining force can be obtained from the overlap width itself, so that the effect is limited.

REFERENCE SIGNS LIST

1: Joining device
2: Molding drum
10: Moving means
11: Guide rail
12: Screw shaft
13: Motor
14: Driven pulley
15: Driving pulley
16: Belt
17: Mounting bracket
18: Piston/cylinder mechanism
30: Joining unit
31: Frame body
32: Floating prevention roll
45: Disk-shaped roll
45*a*: Support
45*b*: Rolling surface
48: Side pressing roll
50: Ring-shaped roll
60: Fixing member
62: Biasing means
70: Tire constituent member
71, 72: End portion
73: joining end
C: Cord
CL: Center portion

The invention claimed is:

1. A device for joining overlapped end portions of a rubber member with an upper end portion overlapping a lower end portion of the rubber member, the device comprising:
   a pressing roll configured to rotate about an inclined shaft inclined by a predetermined inclination angle $\theta_1$ in a plan view toward a joining end with respect to a travel direction of the pressing roll and disposed being inclined forward by $\theta_2$ with respect to a surface of the upper end portion of the rubber member;
   a piston/cylinder mechanism configured for pressing a rolling surface of the pressing roll against the overlapped upper end portion of the rubber member; and
   a side pressing roll configured to constrain the lower end portion of the rubber member while the pressing roll extends the upper end portion of the rubber member, the side pressing roll being adjacently disposed on a joining end side of the pressing roll,
   a moving unit configured for rolling the rolling surface of the pressing roll while pressing the rolling surface thereof against the upper end portion of the rubber member, the moving unit comprising:
      a guide rail having a linear axis arranged perpendicular to the travel direction;
      a screw shaft disposed parallel to and above the guide rail;
      a motor configured to drive the screw shaft; and
      a mounting bracket mounted on the screw shaft and fixed to the piston/cylinder mechanism,
   wherein joining is performed with the upper end portion being extended and a joining area between the end portions to be joined being increased by rolling the rolling surface of the pressing roll while pressing it against the upper end portion of the rubber member.

2. The device for joining overlapped end portions of the rubber member according to claim 1, wherein
   the pressing roll is a disk-shaped roll having the rolling surface inclined toward a rotation center.

3. The device for joining overlapped end portions of the rubber member according to claim 2, wherein
an overlap width between the end portions of the rubber member is smaller than a width of the rolling surface of the disk-shaped roll.

4. The device for joining overlapped end portions of the rubber member according to claim 3, wherein
the overlap width is from 0.1 mm to 10 mm.

5. The device for joining overlapped end portions of the rubber member according to claim 2, wherein
the rolling surface of the disk-shaped roll that abuts against the rubber member is subjected to surface roughening processing.

6. The device for joining overlapped end portions of the rubber member according to claim 2, wherein
the disk-shaped roll is attached to a joining unit, and
a floating prevention roll of the rubber member is disposed ahead of the joining unit in a travel direction of the disk-shaped roll.

7. The device for joining overlapped end portions of the rubber member according to claim 6, wherein
a zipper roll is disposed between the floating prevention roll and the disk-shaped roll in the joining unit.

8. The device for joining overlapped end portions of the rubber member according to claim 6, wherein
a rear pressing roll is disposed rearward in the travel direction of the disk-shaped roll in the joining unit.

* * * * *